(12) United States Patent
Schott

(10) Patent No.: US 12,309,465 B2
(45) Date of Patent: May 20, 2025

(54) DECODER BOX FOR REPRODUCING AN ADDITIONAL AUDIO TRACK

(71) Applicant: SAGEMCOM BROADBAND SAS, Rueil Malmaison (FR)

(72) Inventor: Vincent Schott, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 203 days.

(21) Appl. No.: 18/085,170

(22) Filed: Dec. 20, 2022

(65) Prior Publication Data
US 2023/0199271 A1 Jun. 22, 2023

(30) Foreign Application Priority Data
Dec. 21, 2021 (FR) .................................. FR2114184

(51) Int. Cl.
*H04N 21/439* (2011.01)
*H04N 21/43* (2011.01)
*H04N 21/81* (2011.01)
*H04N 21/8547* (2011.01)
*H04R 1/10* (2006.01)

(52) U.S. Cl.
CPC ..... *H04N 21/8106* (2013.01); *H04N 21/4302* (2013.01); *H04N 21/439* (2013.01); *H04N 21/8547* (2013.01); *H04R 1/10* (2013.01)

(58) Field of Classification Search
CPC ........... H04N 21/8106; H04N 21/4302; H04N 21/439; H04N 21/8547; H04R 1/10
See application file for complete search history.

(56) References Cited

U.S. PATENT DOCUMENTS

| | | | |
|---|---|---|---|
| 2008/0320545 A1* | 12/2008 | Schwartz | H04N 7/17318 725/135 |
| 2013/0050399 A1* | 2/2013 | Gorzynski | H04N 7/142 348/E7.083 |
| 2015/0063780 A1 | 3/2015 | Shintani | |
| 2017/0201788 A1 | 7/2017 | Seidel et al. | |
| 2019/0118098 A1* | 4/2019 | Payzer | A63F 13/77 |
| 2021/0306699 A1 | 9/2021 | Wang | |

FOREIGN PATENT DOCUMENTS

WO WO2016/018787 A1 2/2016

\* cited by examiner

*Primary Examiner* — Thai Q Tran
*Assistant Examiner* — Jose M Mesa
(74) *Attorney, Agent, or Firm* — MUNCY, GEISSLER, OLDS & LOWE, P.C.

(57) ABSTRACT

A decoder box includes an input connected to a source producing an audio-video stream comprising an inbound video stream and an inbound audio stream comprising a main inbound audio track, and an additional inbound audio track; a video output connected to video reproduction equipment, a first audio output connected to an audio reproduction module comprising at least one speaker and one second audio output connected to earphones; a video processing chain to produce an outbound video stream and transmit it to the video reproduction equipment; a main audio processing chain to produce, from the main inbound audio track, a main outbound audio track and transmit it to the audio reproduction module; an additional audio processing chain to produce, from the additional audio track, an additional outbound audio track and transmit it to the earphones.

15 Claims, 3 Drawing Sheets

DECODER BOX FOR REPRODUCING AN ADDITIONAL AUDIO TRACK

The invention relates to the field of reproducing audio via a decoder box.

BACKGROUND OF THE INVENTION

Set-top boxes conventionally enable to transmit an audio-video stream, produced by a source, to one or more audio-video reproduction equipment, such as a television. The source can be of the broadcasting type (like for example, satellite, terrestrial digital television or also cable) or also, of OTT (over the top) type, like for example a server connected to the Internet).

A broadcasting-type source is governed by the DVB (Digital Video Broadcasting) standard, to which the audio-video streams are divided into packets, each packet having a PID identifier (packet identifier). An OTT-type source is governed by so-called "adaptative streaming" technologies, such as DASH or also HLS (HTTP live streaming), in which audio-video streams are transmitted with a URL (uniform resource locator) in a "manifest" file.

In reference to FIG. 1, a set-top box 1 conventionally comprises an input 1A connected to a source 2 and an audio-video output 1B connected to audio-video reproduction equipment 3, which is, in this case, a television. The source 2 produces an audio-video stream comprising an inbound video stream (FV) and an inbound audio stream (FA).

The decoder box 1 further comprises a video processing chain 4, receiving the inbound video stream on the input 1A of the decoder box 1, and an audio processing chain 5, receiving the inbound audio stream on said input 1A of the decoder box 1.

The video processing chain 4 comprises a decoding module 6. The audio processing chain 5 comprises a decoding module 7, a shaping module 8 and a control module 9. The control module 9 is, in this case, common to the video processing chain 4 and to the audio processing chain 5. The inbound video stream and the inbound audio stream are therefore each processed by distinct processing chains.

The decoder box 1 further comprises a clock 10 connected to the decoding module 6 and to the decoding module 7.

The decoding module 7 makes it possible to convert the inbound audio stream into a raw format, like for example a PCM (pulse-code modulation) format. The clock 10 thus makes it possible to perform a first synchronisation between the video stream and the audio stream.

The shaping module 8 then makes it possible to adapt the inbound audio stream (in raw format) via mixing and/or encoding methods.

Finally, the control module 9 provides an outbound video stream and an outbound audio stream to the television 3 via the audio-video output 1B. The control module 9 thus makes it possible to adapt the image and the sound to the physical output. The control module 9 comprises, for example, an HDMI (high-definition multimedia interface) driver—to which case, the audio-video output 1B is an HMDI port.

The outbound audio stream is thus reproduced by speakers which are internal and/or external to the television 3.

For an audio-video stream of a given programme (when viewing), the audio stream can comprise a plurality of audio tracks associated with one same video stream. For example, each audio track can correspond to a language of the programme. The audio stream can also comprise a main audio track integrating a main audio content, i.e. an original audio content of the programme, and an additional audio track integrating audio description content. The audio description content makes it possible to have a spoken description of the video content of the programme. The audio description content is in particular targeted for people with visual deficiencies.

Decoder boxes are known, making it possible to choose, via a user interface, to reproduce either the main audio track, or the additional audio track (on speakers internal and/or external to the television 2).

The major disadvantage is therefore that if a viewer (for example, having a visual deficiency) watches a programme with the audio description content, a viewer without visual deficiency cannot watch the programme, with only the original audio content.

OBJECT OF THE INVENTION

An object of the invention is therefore to propose a decoder box making it possible to resolve the problem posed above.

SUMMARY OF THE INVENTION

In view of achieving this object, a decoder box is proposed, comprising:
  an input arranged to be connected to a source producing an audio-video stream comprising an inbound audio stream and an inbound video stream, the inbound audio stream comprising a main inbound audio track which is intended to be reproduced to form an ambient sound and an additional inbound audio track, distinct from the main inbound audio track, which comprises commentaries relating to the inbound video stream, and which is intended to be reproduced to one single user via earphones;
  a video output arranged to be connected to video reproduction equipment, a first audio output arranged to be connected to an audio reproduction module comprising at least one speaker, and a second audio output, distinct from the video output and from the first audio output, and arranged to be connected to the earphones;
  a video processing chain arranged to produce, from the inbound video stream, an outbound video stream, and to transmit the outbound video stream to the video reproduction equipment via the video output;
  a main audio processing chain arranged to produce, from the main inbound audio track, a main outbound audio track synchronised with the outbound video stream, and to transmit the main outbound audio track to the audio reproduction module via the first audio output;
  an additional audio processing chain arranged to produce, from the additional inbound audio track, an additional outbound audio track synchronised with the outbound video stream, and to transmit the additional outbound audio track to the earphones via the second audio output.

The decoder box according to the invention is therefore particularly advantageous, as it comprises an additional audio processing chain, distinct from the video processing chain and from the main audio processing chain, to transmit the additional outbound audio track to earphones (which are distinct from the audio reproduction module). A view without visual deficiency can therefore watch a programme on the video reproduction equipment by listening to the main outbound audio track reproduced by the audio reproduction module. At the same time, a viewer having a visual deficiency can watch the same programme on the video reproduction equipment by listening to the additional audio track reproduced only for them in the earphones.

Furthermore, the decoder box according to the invention ensures that the outbound video stream, the main outbound audio track and the additional outbound audio track are synchronised.

The decoder box according to the invention thus enables a viewer without visual deficiency and a viewer having a visual deficiency to watch the same programme in a synchronised manner without disturbing one another.

According to a particular embodiment, the audio reproduction module is integrated in the decoder box.

Optionally the audio reproduction module is integrated in an audio speaker distinct from the decoder box.

Optionally, the additional inbound audio track integrates an additional audio content which is an audio description content associated with a main audio content integrated in the main audio track.

Optionally, the second audio output is a Bluetooth (trademark) output.

According to a particular embodiment, the main inbound audio track integrates a main audio content and the additional inbound audio track integrates the main audio content and an additional audio content, the additional audio processing chain thus comprises an extraction module receiving the main inbound audio track and the additional inbound audio track, and being arranged to subtract said main inbound audio track to said additional inbound audio track, such that the additional outbound audio track integrates only the additional audio content.

Optionally, the extraction module implements an algorithm for processing the signal using a cross-correlation calculation between the main inbound audio track and the additional inbound audio track to synchronise said main inbound audio track and said additional inbound audio track.

Advantageously, the main inbound audio track and the additional inbound audio track each further integrate timestamp information, the extraction module thus uses the timestamp information to synchronise said main inbound audio track and said additional inbound audio track.

According to a particular embodiment, the inbound audio track comprises only a common inbound audio track, the common inbound audio track integrates a main audio content which is a first channel of the inbound audio stream, and an additional audio content which is a second channel of the inbound audio stream, the decoder box thus comprises a selection module, positioned upstream from the main audio processing chain and from the additional audio processing chain, and arranged to separate the first channel and the second channel, the main outbound audio track thus integrates the first channel and the additional outbound audio track thus integrates the second channel.

Preferably, the selection module receives a metadatum to identify the first channel and the second channel of the inbound audio stream.

According to a particular embodiment, the inbound audio track is a stereo audio stream.

The main inbound audio track and the additional inbound audio track are thus each a mono audio track. The main audio content is the first channel which is the "left" channel and the additional audio content is the second channel which is the "right" channel of the inbound stereo audio stream.

According to a particular embodiment, the main inbound audio track integrates a main audio content and the additional inbound audio track integrates the main audio content and an additional audio content, the additional audio processing chain is thus arranged such that the additional outbound audio track integrates the main audio content and the additional audio content.

According to a particular embodiment, the inbound audio stream comprises only a common inbound audio track, the common inbound audio track integrates a main audio content which is a first channel of the inbound audio stream, and an additional audio content which is a second channel of the inbound audio stream, the decoder box thus comprises a selection module, positioned upstream from the main audio processing chain and from the additional audio processing chain, and arranged to separate the first channel from the second channel, the additional audio processing chain further comprises a mixing module, receiving the first channel and the second channel, and being arranged to mix said first channel and said second channel, such that the additional outbound audio track integrates the first channel and the second channel.

According to a particular embodiment, the main inbound audio track integrates a main audio content and the additional inbound audio track integrates an additional audio content, the additional audio processing chain thus further comprises a mixing module, receiving said main inbound audio track and said additional inbound audio track, and being arranged to mix said main inbound audio track and said additional inbound audio track, such that the additional outbound audio track integrates the additional audio content and the main audio content.

Advantageously, the decoder box further comprises a user interface arranged to enable a user to define an audio content integrated in the additional inbound audio track.

Preferably, the decoder box is arranged to compensate for a delay introduced by a communication link connecting the second audio output and the earphones.

According to a particular embodiment, the decoder box comprises a plurality of second audio outputs, each arranged to be connected to distinct earphones, the delay thus being determined based on the slowest communication link.

The invention also relates to a multimedia system comprising a decoder box such as described above, as well as the video reproduction equipment, the audio reproduction module and the earphones.

Other features and advantages of the invention will emerge upon reading the following description of particular, non-limiting embodiments of the invention.

BRIEF DESCRIPTION OF THE DRAWINGS

The description of the invention makes reference to the accompanying drawings, among which.

DETAILED DESCRIPTION OF THE INVENTION

It is understood, in this case, that an audio channel is an element belonging to a multichannel audio stream. For example, a stereo or also 5.1 audio stream is a multichannel audio stream. However, an audio track is an element which comprises one or more any audio contents, each content being able to be one single channel of a multichannel audio stream.

Figure 2:
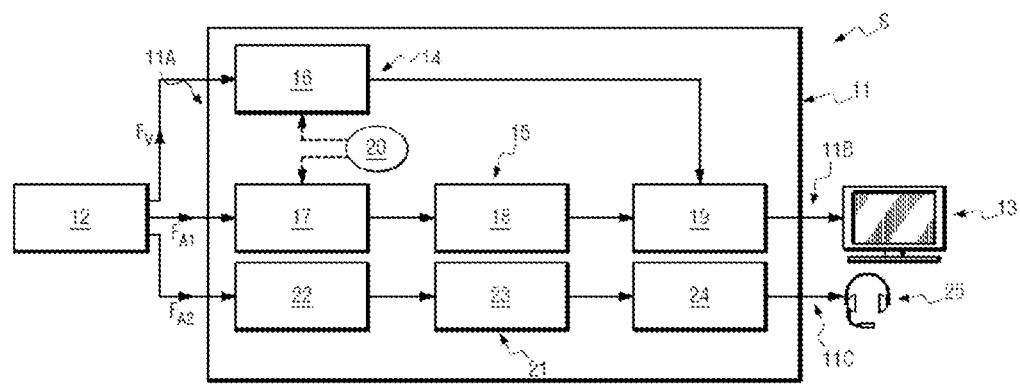
FIG. 2 represents a functional diagram of a decoder box according to a first particular embodiment of the invention.
Figure 3:
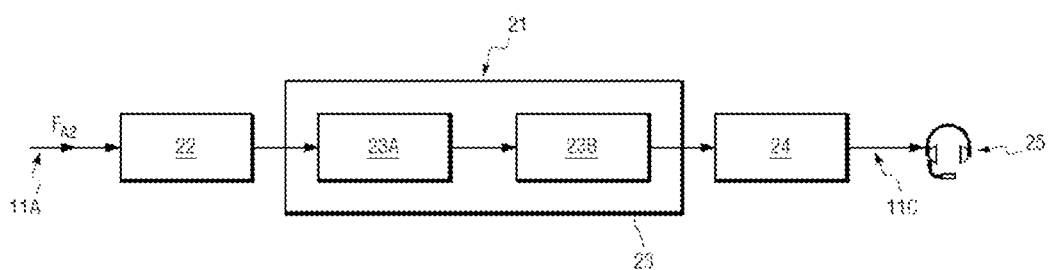
FIG. 3 represents a functional diagram of the additional processing chain of a decoder box according to the invention.

In reference to FIGS. 2 and 3, a decoder box 11 according to the invention is described. The decoder box 11 comprises an input 11A. The decoder box 11 comprises, in addition, a video output, a first audio output and a second audio output.

The input 11A of the decoder box 11 is connected to a source 12.

The video output of the decoder box 11 is connected to video reproduction equipment which is, in this case, a television 13.

The first audio output of the decoder box 11 is connected to an audio reproduction module comprising at least one speaker. The audio reproduction module is, in this case, integrated in the television 13.

More specifically, the video output and the first audio output are in fact integrated in one same port to form an audio-video output 11B. The audio-video output 11B is, in this case, an HDMI (high-definition multimedia interface) port.

If the video output and the first audio output are distinct (not integrated in the same port), said video output can be connected to the television 13 and said first audio output could be connected to an audio reproduction module integrated in an audio speaker distinct from the television 13. The first audio output could thus be an S/PDFI or HDMI output. Furthermore, always if the video output and the first audio output are distinct, the first audio output could be connected to an audio reproduction module integrated in the decoder box (in the case of a VSB, (video sound box)).

The second audio output 11C of the decoder box 11 is connected to earphones which are, in this case, integrated in an audio headset 25. The audio headset 25 is intended to make the audio reproduction for one single user. The audio headset 25 is, in this case, a Bluetooth (trademark) audio headset. The second audio output 11C is therefore a Bluetooth (trademark) output.

The decoder box 11, the source 12, the television 13, the audio reproduction module (integrated in the television 13) and the audio headset 25 (comprising the earphones) form a multimedia system S.

The source 12 produces an audio-video stream comprising an inbound audio stream (FA) and an inbound video stream (FV). Furthermore, the inbound audio stream comprises a main inbound audio track (FA1) and an additional inbound audio track (FA2).

The main inbound audio track is intended to be reproduced to form an ambient sound. The ambient sound corresponds to a background or surrounding sound, present in the environment of the audio reproduction module and intended to be heard by any person present in said environment, opposing a sound which is listened to via earphones (by one single person). The main audio track is therefore intended to be reproduced simultaneously to several users, without said users each having personal earphones. The main inbound audio track integrates a main audio content which is, in this case, an original content of a programme broadcast during viewing on the television 13.

The additional inbound audio track is distinct from the main audio track and comprises commentaries relating to the inbound video stream. The additional inbound audio track, contrary to the main audio track, is intended to be reproduced to one single user via earphones (the earphones integrated in the audio headset 25). The additional inbound audio track integrates at least one additional audio content which is an audio description content, therefore corresponding to commentaries intended to describe the inbound video stream.

The source 12 can produce one or more additional audio tracks, in addition to a main audio track according to several configurations.

For a broadcasting type source, the DVB (Digital Video Broadcasting) standard provides that the PMT (Programme Map Table) comprises a PID (Packet Identifier) of the main inbound audio track and a PID of the additional inbound audio track. For an OTT type source, for example according to DASH technology, the main inbound audio track and the additional inbound audio track are declared in a "manifest file. Whatever the type of source, the inbound audio stream thus comprises the main inbound audio track, which integrates the main audio content, as well as the additional inbound audio track, which integrates the additional audio content.

Furthermore, a broadcasting or OTT source can also produce an inbound audio stream comprising the main inbound audio track, integrating the main audio content, as well as the additional inbound track, integrating the main audio content and the additional audio content. The additional inbound audio track is thus a premixed audio track.

Finally, a broadcasting or OTT source can produce an inbound audio stream using a multichannel format (for example, stereo). In this case, the inbound audio stream comprises one single audio track which is a common audio track integrating the main audio content which is a first channel of said inbound audio stream, the additional audio content which is a second channel of the inbound audio stream.

Figure 1:
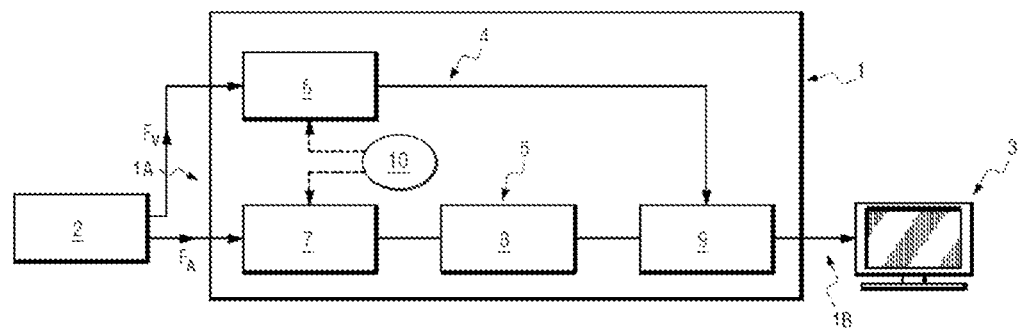
FIG. 1 represents a functional diagram of a decoder box of the prior art.

The decoder box 11 comprises a video processing chain 14 (similar to the video processing chain 4 of the decoder box 1 which can be seen in FIG. 1), a main audio processing chain 15 (similar to the audio processing chain 5 of the decoder box 1) and an additional audio processing chain 21. The processing chains 14, 15, 21 are implemented by one or more processing components integrated in the decoder box 11. The processing component(s) can be a DSP (digital signal processor), a processor, a microcontroller, an FPGA (field programmable gate array) or also an ASIC (application-specific integrated circuit). The decoder box comprises at least one memory connected to the processing component(s). The memory forms a recording medium which can be read by a computer, on which computer programs comprising instructions are recorded.

The video processing chain 14 receives the inbound video stream (FV) via the input 11A of the decoder box 11.

The main audio processing chain 15 receives the main inbound audio track (FA1) of the inbound audio stream via the input 11A of the decoder box 11.

The additional audio processing chain 21 receives the additional inbound audio track (FA2) of the inbound audio stream via the input 11A of the decoder box 11.

It is assumed that a viewer without visual deficiency watches the broadcast programme on the television 13 with the main audio stream (the original audio content) reproduced by the speaker(s) or the audio reproduction module integrated with the television 13, and that a viewer having a visual deficiency watches the broadcast programme on the television 13 with the additional audio track (the audio description content) reproduced by the earphones of the audio headset 25. Knowing that the audio headset 25 does not prevent the viewer having a visual deficiency from hearing the main audio track, said viewer listens simultaneously to the main audio track and the additional audio track, i.e. the original audio content and the audio description content.

According to a first embodiment, the additional inbound audio track integrates only the additional audio content which is the audio description content associated with the inbound video stream.

The video processing chain 14 comprises a decoding module 16. The main audio processing chain 15 comprises successively a decoding module 17, a shaping module 18 and a control module 19. The control module 19 is, in this case, common to the video processing chain 14 and to the main audio processing chain 15, as the video output and the first audio output are integrated in one same port to form the audio-video output 11B.

The decoder box 11 further comprises a clock 20 connected to the decoding module 16 and to the decoding module 17. The clock 20 can be generated from additional data integrated in the audio-video stream, but different from the audio stream and from the video stream; or also directly generated from data integrated in the audio stream and/or the video stream. The clock 20 makes it possible to perform a first synchronisation between the inbound video stream and the main inbound audio track.

The decoding module 16 and the decoding module 17 make it possible to convert respectively the inbound video stream and the main inbound audio track in a raw format, like for example a PCM (pulse-code modulation) format.

The shaping module 18 makes it possible then to adapt the main inbound audio track, via for example, mixing and encoding methods, to the audio-video output 11B.

The control module 19 provides an outbound video stream and a main outbound audio track to the television 13 via the audio-video output 11B. The control module 19 can also perform a finer synchronisation between the outbound video stream and the main outbound audio track. The control module 19 thus makes it possible to adapt the image and the sound to the physical output. The control module 19 comprises, for example, an HMDI driver.

The video processing chain 14 is thus arranged to produce, from the inbound video stream (FV), the outbound video stream, and to transmit said outbound video stream to the television 13 via the audio-video output 11B.

The main audio processing chain 15 is thus arranged to produce, from the main inbound audio track (FA1), the main outbound audio track synchronised with the outbound video stream, and to transmit said main outbound audio track to the audio reproduction module integrated with the television 13 via the audio-video output 11B.

It is reminded that the audio reproduction module is not necessarily integrated in the television 13, but could be directly integrated in the decoder box 11 (in the case of a VSB). The main outbound audio track could thus be transmitted via the first audio output to be reproduced by the speaker(s) of the audio reproduction module integrated in the decoder box 11. Furthermore, it is also reminded that the audio reproduction module could also be integrated in an audio speaker distinct from the television 13. The main outbound audio track could thus be transmitted via the first audio output to be reproduced by the speaker(s) of the audio reproduction module integrated in the audio speaker.

The additional audio processing chain 21 comprises successively a decoding module 22, a shaping module 23 and a control module 24.

The decoding module 22 makes it possible to convert the additional inbound audio track into a raw format, like for example a PCM format. It must be noted that in FIG. 2, the clock 20 is not connected to the decoding module 22, but this could be the case.

The shaping module 23 makes it possible then to adapt the additional inbound audio track to the second audio output 11C which is, in this case, a Bluetooth (trademark) output. The shaping module 23 thus comprises an encoding unit 23B.

Optionally, the shaping module 23 comprises a downmixing unit 23A. For example, if the additional inbound audio track is a multichannel format audio track comprising six channels, the downmixing unit 23A makes it possible to convert the additional inbound audio track to the multichannel stereo format (i.e. with two channels).

The control module 24 provides an additional outbound audio track to the audio headset 25 via the second audio output 11C. The control module 24 can also perform a synchronisation between the outbound video stream and the additional outbound audio track. The control module 24 comprises, in this case, a Bluetooth (trademark) driver.

The additional audio processing chain 21 is thus arranged to produce, from the additional inbound audio track (FA2), the additional outbound audio track synchronised with the outbound video stream, and to transmit said additional outbound audio track to the audio headset 25 via the second audio output 11C.

Optionally, the downmixing unit 23A can convert the additional inbound audio track to mono format. Thus, if the headset 25 comprises two earpieces each reproducing the additional outbound audio track (in mono format), a viewer can choose to listen to the additional outbound audio track via one single earpiece (disposed on their ear). The view can thus listen to the main outbound audio track (reproduced by speakers, internal and/or external to the television 13) with their other ear. This option could be configurable, by the viewer, via a user interface located on the decoder box 11.

It must be noted, in this case, that the presence of the decoding module 17 and of the decoding module 22 is optional, given that neither the main audio processing chain 15, nor the additional audio processing chain 21 implement any signal processing algorithm.

Figure 4:
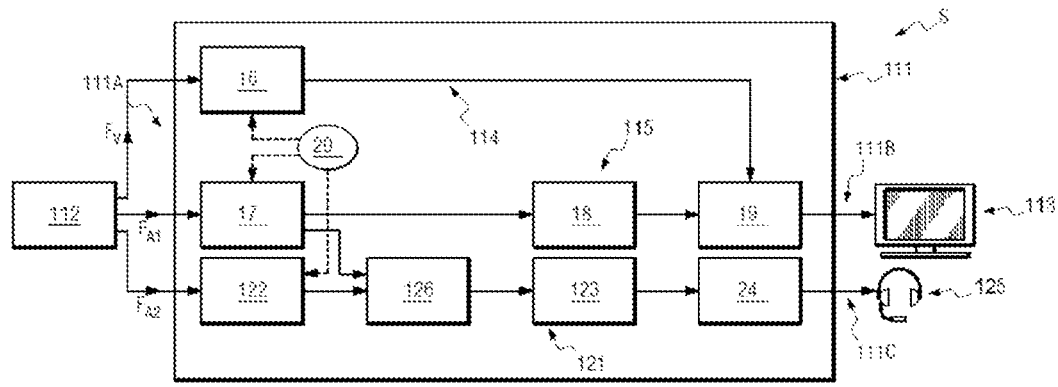
FIG. 4 represents a functional diagram of a decoder box according to a second particular embodiment of the invention.

In reference to FIG. 4, a decoder box 111 according to a second embodiment of the invention is described.

The source 112 produces the inbound audio stream comprising the main inbound audio track (FA1) and the additional inbound audio track (FA2). The main inbound audio track integrates the main audio content and the additional inbound audio track integrates the main audio content and the additional audio content. The additional audio track therefore integrates the original content, as well as the audio description content of the programme being viewed.

The decoder box 111 comprises an additional audio processing chain 121. The decoder box 111 differs from the decoder box 11 in that the additional audio processing chain 121 comprises an extraction module 126 positioned downstream from the decoding unit 122 and upstream from the shaping unit 123. In this case, by "upstream", this means on the side of the source; and by "downstream", this means on the side of the reproduction equipment.

The extraction module 126 receives the main inbound audio track and the additional inbound audio track (in raw format) and is arranged to circumvent said main audio track to said additional inbound audio track. The extraction module 126 thus ensures that the additional outbound audio track integrates only the additional audio content.

The earphones of the audio headset 125 therefore reproduce sonly the additional audio content (i.e. only the audio description content).

The extraction module 126 implements, for example, a signal processing algorithm using a cross-correlation calculation between the main inbound audio track and the additional inbound audio track. Thus, the extraction module 126 makes it possible to synchronise said main inbound audio track and said additional inbound audio track for the circumvention operation.

The main inbound audio track and the additional inbound audio track could further each integrate timestamp information (for example, a timestamp field). In this case, the extraction module 126 can use the timestamp information to synchronise said main inbound audio track and said additional inbound audio track. The extraction module 126 does not thus require implementing a cross-correlation algorithm.

Figure 5:
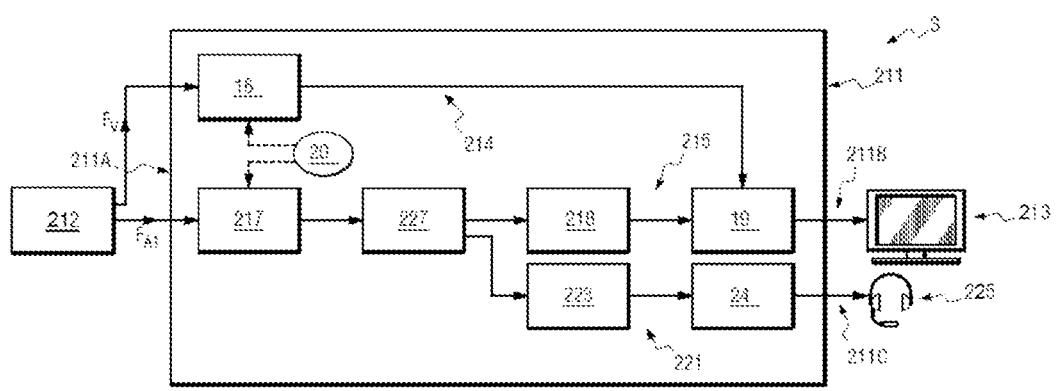
FIG. 5 represents a functional diagram of a decoder box according to a third particular embodiment of the invention.

In reference to FIG. 5, a decoder box 211 according to a third embodiment of the invention is described.

The source 212 produces the multichannel format inbound audio stream (FA), in this case, in stereo format. The inbound audio stream comprises only a common inbound audio track, the common inbound audio track integrates a main audio content, which is a first channel of the inbound audio stream, and an additional audio content, which is the second channel of the inbound audio stream. The original audio content and the associated audio description content are therefore each a particular channel of the inbound audio stream.

The decoder box 211 differs from the decoder box 11, in that it comprises a selection module 227, positioned upstream from the main audio processing chain 215 and of the additional audio processing chain 221. In addition, the decoder box 211 also comprises one single decoding module 217 (which can be similar to the decoding module 17) positioned downstream from the selection module 227.

The selection module 227 receives the inbound audio stream (in raw format) and is arranged to separate the first channel and the second channel. Thus, the main inbound audio track integrates the first channel (the main audio content) and the additional inbound audio track integrates the second channel (the additional audio content). The main inbound audio track and the additional inbound audio track therefore come from the common inbound audio track.

Furthermore, the main outbound audio track thus integrates the first channel and the additional outbound audio track thus integrates the second channel.

The earphones of the audio headset 225 therefore reproduces only the additional audio content (i.e. the audio description content).

Knowing that the inbound audio stream is in stereo format, the main inbound audio track (received on the shaping module 218 of the main audio processing chain 215) is thus in mono format. For the same reason, the additional inbound audio track (received on the shaping module 223 of the additional audio processing chain 221) is in mono format.

Optionally, the shaping module 218 and the shaping module 223 each comprises an upmixing unit. The main inbound audio track (in this case, in mono format) and the additional inbound audio track (also in mono format) could thus each be converted into stereo format (via the shaping modules 218, 223). The main outbound audio track and the additional outbound audio track are thus each in stereo format.

Preferably, the selection module 227 receives a metadatum to identify the channel(s) associated with the original audio content and the channel(s) associated with the audio description content). The metadatum can be transmitted via the PMT, if the source 212 is a broadcasting type source or in the "manifest" file, if the source 212 is an OTT type source (according to DASH technology). The metadatum could also be defined by convention between the source 212 and the decoder box 211.

Naturally, the third embodiment described in this case is applicable, whatever the multichannel format of the inbound audio track. The inbound audio stream could, for example, be in 5.1 format, or greater. The main inbound audio track and the additional inbound audio track could thus each be in stereo format.

The inbound audio stream can be a dual stereo multichannel audio stream. Furthermore, the main audio track can be in mono, and the additional audio track can be in stereo (and vice versa). In this case, the adaptation module will handle adjusting the format of the audio track considered to the corresponding equipment.

For the three embodiments which have just been presented, it has been a question of separating the main audio content (original audio content of a broadcast programme) from the audio description content (relating to the inbound video stream). By separating these two contents, the viewer having a visual deficiency avoids hearing the main audio content, both via the speaker(s) of the audio reproduction module integrated (or not) in the television and via the earphones of the audio headset. However, it is absolutely possible to transmit both the original audio content and the audio description content to the audio headset. This is particularly advantageous if the audio headset is active noise-reducing equipment. Indeed, in this case, the viewer having a visual deficiency is not able to hear the original audio content reproduced by the speakers of the audio reproduction module.

Figure 6:
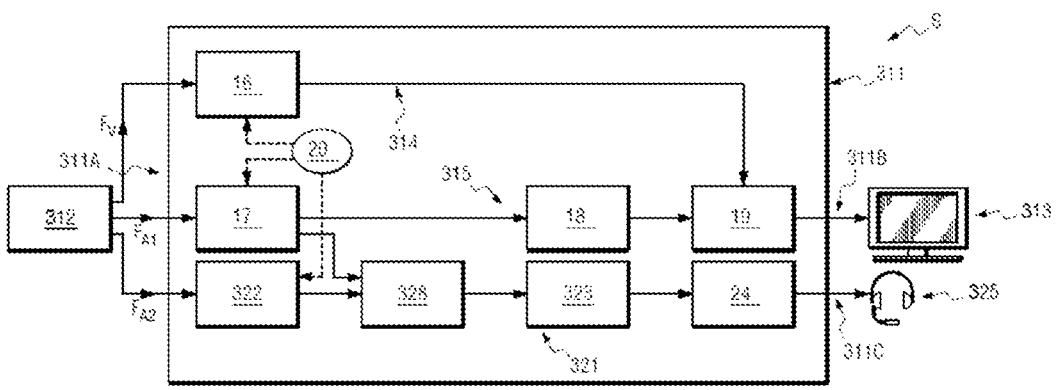
FIG. 6 represents a functional diagram of a decoder box according to a fourth particular embodiment of the invention.

In reference to FIG. 6, a decoder box 311 according to a fourth embodiment of the invention is described. This is a configuration of the inbound audio stream similar to the first embodiment.

The main inbound audio track (FA1) integrates the main audio content and the additional inbound audio track (FA2) integrates the additional audio content.

The decoder box 311 comprises an additional audio processing chain 321. The decoder box 311 differs from the decoder box 11 in that the processing chain 321 comprises a mixing module 328 positioned downstream from the decoding unit 322 and upstream from the shaping unit 323.

The mixing module 328 receives the main inbound audio track and the additional inbound audio track (in raw format) and is arranged to mix said main inbound audio track and said additional inbound audio track. The mixing module 328 thus ensures that the additional outbound audio track integrates the additional audio content and the main audio content.

The earphones of the audio headset 325 therefore reproduces the main audio content and the additional audio content.

Figure 7:
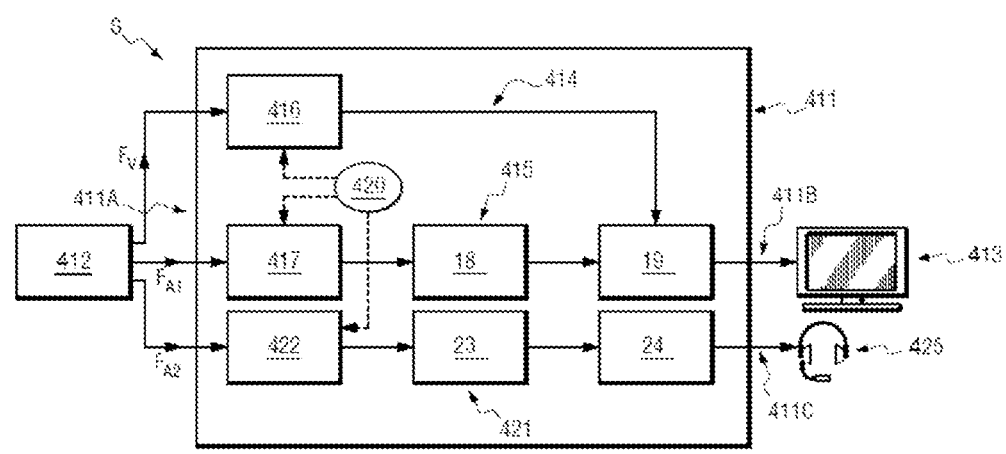
FIG. 7 represents a functional diagram of a decoder box according to a fifth particular embodiment of the invention.

In reference to FIG. 7, a decoder box 411 according to a fifth embodiment of the invention is described. This is a configuration of the inbound audio stream similar to the second embodiment.

The main inbound audio track integrates the main audio content and the additional inbound audio track integrates the main audio content and the additional audio content.

The decoder box 411 differs from the decoder box 11 in that the clock 420 is connected to the decoding module 422 of the additional audio processing chain 421 (and also to the decoding module 416 and to the decoding module 417).

In this case, the additional audio processing chain 421 produces directly the additional outbound audio track, from the additional inbound audio track, and transmits said additional audio track to the audio headset 425 via the second audio output 411C.

It must be noted that neither the main audio processing chain 415, nor the additional audio processing chain 421 do not implement any signal processing algorithm. The decoding module 417 and the decoding module 422 are therefore optional.

Figure 8:
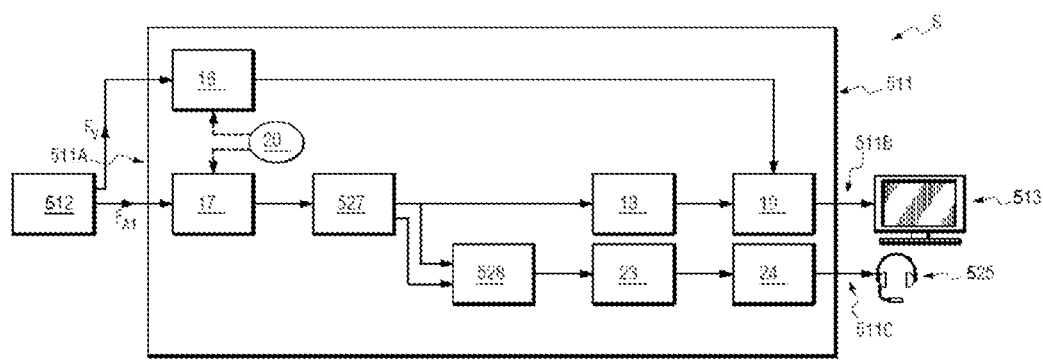
FIG. 8 represents a functional diagram of a decoder box according to a sixth particular embodiment of the invention.

In reference to FIG. 8, a decoder box 511 according to a sixth embodiment of the invention is described. This is a configuration of the inbound audio stream similar to the third embodiment.

The inbound audio stream comprises only a common inbound audio track, the common inbound audio track integrates a main audio content which is a first channel of the inbound audio stream, and an additional audio content, which is a second channel of the audio stream.

The decoder box 511 differs from the decoder box 11 in that it comprises a selection module 527 (which can be similar to the selection module 227 of the decoder box 211). In addition, the additional audio processing chain 521 further comprises a mixing module 528 (which can be similar to the mixing module 328 of the decoder box 311). The mixing module 528 is positioned directly upstream from the selection module 227.

The selection module 527 is arranged to separate the first channel and the second channel. The mixing module 528 thus receives the first channel and the second channel and is arranged to mix said first channel and said second channel.

The additional outbound audio track thus integrates the main audio content (the first channel) and the additional audio content (the second channel). The earphones of the audio headset 525 therefore reproduces the main audio content and the additional audio content.

In the same way as for the third embodiment, it is provided that the selection module 527 receives a metadatum for identifying the channel(s) associated with the main audio content and/or the channel(s) associated with the additional audio content.

It is provided that the decoder box according to the invention further comprises a user interface, making it possible to define the audio content integrated in the additional inbound audio track.

The user can, in particular, thus define:
that the additional inbound audio track integrates only the additional audio content, in this case, the audio description content;
that the additional inbound audio track integrates the main audio content and the additional audio content, i.e. the original audio content and the audio description content;
the number of channels integrated in the additional outbound audio track transmitted to the audio headset;
if the main audio track and the additional audio track are in mono format, the (Left or Right) path, preferably;
if the main audio track and the additional audio track are in stereo format, the multichannel paths preferably for each audio content.

In use, and whatever the configuration of the user, an audio content reproduced by the earphones of each audio headset will systematically have a delay on an audio-video content reproduced by the television. The delay is, in this case, introduced by a communication link connecting the second audio output of the decoder box and the audio headset. The delay corresponds to the transfer time of an audio content of the decoder box to the audio headset. The delay is, in this case, specific to the audio headset.

The decoder box according to the invention is arranged to compensate for the delay introduced by the communication link.

The delay can be known by the user via a settings menu, or also via a database indicating, according to a reference of a given audio headset, the associated delay. The delay could also be directly determined by capturing the audio content reproduced by the audio headset via microphones internal to the decoder box (by connecting said audio headset of the decoder box).

Furthermore in the case where the decoder box comprises a plurality of second audio outputs each arranged to be connected to a distinct audio headset (for example, several Bluetooth (trademark) audio headsets), the delay is determined based on the slowest communication link.

The decoder box according to the invention is therefore particularly advantageous, as it comprises an additional audio processing chain, distinct from the video processing chain and from the main audio processing chain, to transmit the additional outbound audio track to earphones (which is equipment distinct from the audio-video reproduction module). A viewer without visual deficiency can therefore watch a programme on the video reproduction equipment by listening to the main outbound audio track reproduced by the audio reproduction module. At the same time, a viewer having a visual deficiency can watch the same programme on the video reproduction equipment by listening to the additional audio track reproduced only for them in the earphones.

Furthermore, the decoder box according to the invention, ensures that the outbound video stream, the main outbound audio track and the additional outbound audio track are synchronised.

The decoder box according to the invention thus enables a viewer without visual deficiency and a viewer having a visual deficiency to watch the same programme in a synchronised manner, without disturbing one another.

Naturally, the invention is not limited to the embodiments described, but comprises any variant entering into the scope of the invention such as defined by the claims.

The decoder box according to the invention could be integrated with the television, or be located in an appliance offering other functionalities (for example, a games console).

In this case, it has been described that the additional audio content is an audio description content associated with an original audio content (which is the main audio content), but this is not limiting. For example, the additional audio track could comprise sport commentaries (for example, the commentaries of a referee).

In this case, it has been described that the earphones are integrated in a Bluetooth (trademark) audio headset, but this is not limiting. The earphones could be integrated in a different audio headset, for example a Wi-Fi headset (connected in a network with the decoder box), or a headset connected to the decoder box via a wired connection. The earphones are further not necessarily integrated in an audio headset, but could be quite simply earphones in the form of earpieces.

In this case, it has been described that the video reproduction equipment 13, 113, 213, 313, 413, 513 is a television, but this is not limiting. The video reproduction equipment 13, 113, 213, 313, 413, 513 could be, quite simply, arranged to reproduce a video stream transmitted by a decoder box.

Naturally, the inbound audio stream in the decoder box could comprise more than one additional inbound audio track. In this case, the decoder box could comprise as many second audio outputs that there are additional inbound audio tracks (each additional outbound audio track could thus be reproduced by one of the distinct earphones). The decoder box could thus comprise an additional audio processing chain dedicated to each of the second audio outputs of said decoder box (i.e. an additional audio processing chain for each additional inbound audio track of the inbound audio stream). Differently, the decoder box could also comprise one single additional audio processing chain common to all the second audio outputs of said decoder box.

The invention claimed is:

1. A decoder box comprising:
an input arranged to be connected to a source producing an audio-video stream comprising an inbound audio stream and an inbound video stream, the inbound audio stream comprising a main inbound audio track, which is intended to be reproduced to form an ambient sound and an additional inbound audio track, distinct from the main inbound audio track, which comprises commentaries relating to the inbound video stream, and which is intended to be reproduced to one single user via earphones, the additional inbound audio track integrates at least an additional audio content which is an audio description content corresponding to said commentaries;
a video output arranged to be connected to video reproduction equipment, a first audio output arranged to be connected to an audio reproduction output arranged to be connected to an audio reproduction module comprising at least one speaker, and a second audio output, distinct from the video output and from the first audio output, and arranged to be connected to the earphones;
a video processing chain arranged to produce, from the inbound video stream, an outbound video stream, and to transmit the outbound video stream to the video reproduction equipment via the video output, the video processing chain comprising a decoding module;
a main audio processing chain arranged to produce, from the main inbound audio track, a main outbound audio track synchronised with the outbound video stream, and to transmit the main outbound audio track to the audio reproduction module via the first audio output, the main audio processing chain comprising successively a decoding module, a shaping module and a control module, the control module providing a main audio track to the audio reproduction module via the first audio output;
an additional audio processing chain arranged to produce, from the additional inbound audio track, an additional outbound audio track synchronised with the outbound video stream, and to transmit the additional outbound audio track to the earphones via the second audio output, the additional audio processing chain comprising successively a decoding module, a shaping module and a control module, the decoding module being potentially common to the one of the main audio processing chain, the control module providing the additional outbound audio track to the earphones via the second audio output so that the earphones reproduce only the additional audio content;
a clock connected to the decoding module of the video processing chain and connected to the decoding module of the main audio processing chain.

2. The decoder box according to claim 1, wherein the audio reproduction module is integrated in the decoder box.

3. The decoder box according to claim 1, wherein the audio reproduction module is integrated in an audio speaker distinct from the decoder box.

4. The decoder box according to claim 1, wherein the additional inbound audio track integrates the additional audio content associated with a main audio content integrated in the main audio track.

5. The decoder box according to claim 1, wherein the second audio output is a Bluetooth output.

6. The decoder box according to claim 1, wherein the main inbound audio track integrates a main audio content and the additional inbound audio track integrates the main audio content and the additional audio content, the additional audio processing chain comprises an extraction module, positioned downstream from the decoding unit of the additional audio processing chain and upstream from the shaping unit of the additional audio processing chain, the extraction module receiving the main inbound audio track and the additional inbound audio track, and is arranged to circumvent said main inbound audio track to said additional inbound audio track, such that the additional outbound audio track integrates only the additional audio content.

7. The decoder box according to claim 6, wherein the extraction module implements a signal processing algorithm using a cross-correlation calculation between the main inbound audio track and the additional inbound audio track to synchronise said main inbound audio track and said additional inbound audio track.

8. The decoder box according to claim 6, wherein the main inbound audio track and the additional inbound audio track further each integrate timestamp information, and the extraction module uses the timestamp information to synchronise said main inbound audio track and said additional inbound audio track.

9. The decoder box according to claim 1, wherein the inbound audio stream comprises only a common inbound audio track, the common inbound audio track integrates a main audio content, which is a first channel of the inbound audio stream, and the additional audio content, which is a second channel of the inbound audio stream, the decoder box comprises a selection module, positioned upstream from the main audio processing chain and from the additional audio processing chain, and arranged to separate the first channel from the second channel, and the main outbound audio track thus integrates the first channel and the additional outbound audio track thus integrates the second channel.

10. The decoder box according to claim 9, wherein the selection module receives a metadatum for identifying the first channel and the second channel of the inbound audio stream.

11. The decoder box according to claim 9, wherein the inbound audio stream is a stereo audio stream, the main inbound audio track and the additional inbound audio track thus each are a mono audio track.

12. The decoder box according to claim 1, further comprising a user interface arranged to enable a user to define an audio content integrated in the additional inbound audio track.

13. The decoder box according to claim 1, wherein the decoder box is arranged to compensate for a delay introduced by a communication link connecting the second audio output and the earphones.

14. The decoder box according to claim 13, comprising a plurality of second audio outputs, each arranged to be connected to distinct earphones, the delay being determined based on the slowest communication link.

15. A multimedia system comprising a decoder box according to claim 1, as well as the video reproduction equipment, the audio reproduction module and the earphones.

* * * * *